(12) United States Patent
Barnes, III

(10) Patent No.: US 10,099,619 B2
(45) Date of Patent: Oct. 16, 2018

(54) MIRROR ASSEMBLY AND METHOD OF REDUCING WIND NOISE THROB

(71) Applicant: FORD GLOBAL TECHNOLOGIES, LLC, Dearborn, MI (US)

(72) Inventor: Nolen Thomas Barnes, III, Bloomfield Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/411,332

(22) Filed: Jan. 20, 2017

(65) Prior Publication Data

US 2018/0208118 A1    Jul. 26, 2018

(51) Int. Cl.
| | |
|---|---|
| *B60R 1/06* | (2006.01) |
| *B60R 1/12* | (2006.01) |
| *B60R 1/00* | (2006.01) |
| *B60J 1/20* | (2006.01) |
| *B60B 1/06* | (2006.01) |

(52) U.S. Cl.
CPC ............... *B60R 1/12* (2013.01); *B60B 1/06* (2013.01); *B60J 1/2097* (2013.01); *B60R 1/006* (2013.01)

(58) Field of Classification Search
CPC ... B60R 1/006; B60R 1/06; B60R 1/12; B60J 1/2097
USPC .......................... 359/841, 877, 843, 871, 900
See application file for complete search history.

(56) References Cited

U.S. PATENT DOCUMENTS

| | | | | |
|---|---|---|---|---|
| 4,915,485 A | * | 4/1990 | Ogasawara | B60R 1/06 248/479 |
| 6,340,231 B1 | * | 1/2002 | Polzer | B60R 1/074 359/872 |
| 6,712,413 B1 | * | 3/2004 | Flowerday | B60R 1/06 248/476 |
| 7,073,914 B2 | | 7/2006 | Pavao | |
| 7,530,625 B2 | * | 5/2009 | Gulker | B60R 1/06 296/1.11 |
| 7,621,588 B2 | * | 11/2009 | Zhu | B60R 1/078 296/152 |
| 7,641,275 B2 | | 1/2010 | Campbell et al. | |
| 2003/0026008 A1 | * | 2/2003 | Tanaka | B60R 1/06 359/838 |
| 2006/0274442 A1 | * | 12/2006 | Brouwer | B60R 1/074 359/877 |
| 2009/0244744 A1 | * | 10/2009 | Okamoto | B60R 1/06 359/872 |

(Continued)

FOREIGN PATENT DOCUMENTS

| | | | |
|---|---|---|---|
| JP | 2007-050761 | * | 3/2007 |
| JP | 2007269102 A | | 10/2007 |
| JP | 2016-159657 | * | 9/2016 |

OTHER PUBLICATIONS

English Machine Translation of JP2007269102A.

*Primary Examiner* — Ricky D Shafer

(74) *Attorney, Agent, or Firm* — Jason Rogers; King & Schickli, PLLC

(57) ABSTRACT

A mirror assembly includes a support arm, a mirror housing carried on the support arm and a mirror body held in the housing. A dynamic surface is provided on the support arm. A control module is configured to displace the dynamic surface between a home position and a deployed position. In the deployed position a wind stream flowing over the dynamic surface is redirected and wind noise throb is reduced.

17 Claims, 4 Drawing Sheets

(56) References Cited

U.S. PATENT DOCUMENTS

2010/0157451 A1* 6/2010 Sugiyama ................ B60R 1/06
              359/841
2012/0154940 A1* 6/2012 Kawanishi ............... B60R 1/06
              359/841

* cited by examiner

MIRROR ASSEMBLY AND METHOD OF REDUCING WIND NOISE THROB

TECHNICAL FIELD

This document relates generally to the motor vehicle equipment field and, more particularly, to a system and method for reducing wind noise throb commonly associated with motor vehicles when one or more windows of the motor vehicle are open and the motor vehicle is traveling at roadway speeds.

BACKGROUND

When one or more windows are opened in a motor vehicle moving at roadway speeds of, for example above 65 kph, a standing wave may form in the passenger compartment of the motor vehicle. When this resonance is combined with a vortex of wind from the side mirror or a pillar adjacent the window, a booming wind noise throb may occur. This wind noise throb may be very loud (e.g. on the order of 125 dB) and at a low frequency of, for example, 50 hertz. Such a wind noise throb is unpleasant and leads to driver or passenger dissatisfaction.

In order to mitigate this problem it has been necessary in the past to either close all the windows, open other windows or alter the speed of the motor vehicle to thereby change the standing wave in the passenger compartment or change the vortex interaction with the wave. This document relates to a new and improved system and method for reducing wind noise throb to acceptable levels without having to close windows, open other windows or adjust the speed of the motor vehicle.

SUMMARY

In accordance with the purposes and benefits described herein, a mirror assembly is provided. That mirror assembly comprises a support arm, a mirror housing carried on the support arm and a mirror body held in the mirror housing. The mirror assembly further includes a dynamic surface on the support arm and a control module. That control module is configured to displace the dynamic surface between a home position and a deployed position wherein the dynamic surface deflects or redirects airflow in a manner to reduce wind noise throb that would otherwise be caused by that air flow passing through the gap between the mirror housing and the side or pillar of the motor vehicle as well as along an adjacent window opening.

The control module may include a controller and an actuator controlled by the controller. The actuator may include a drive motor, a pinion driven by the drive motor and a gear rack carried on the dynamic surface wherein the pinion engages the gear rack.

The controller may be configured to displace the dynamic surface between the home position and the deployed position in response to data input respecting window position status. The controller may be configured to displace the dynamic surface between the home position and the deployed position in response to data input respecting sound pressure within a passenger compartment of a motor vehicle on which the mirror assembly is carried.

In accordance with an additional aspect, a new and improved method is provided of reducing wind noise throb associated with an open window of a motor vehicle. That method comprises displacing, by actuator, a dynamic surface on a support arm of a mirror assembly from a home position to a deployed position whereby a wind stream flowing over the dynamic surface is redirected and wind noise throb is reduced.

The method may further include the step of controlling operation of the actuator with a controller. The method may also include the step of configuring that controller to displace the dynamic surface into the deployed position in response to the window being open. Further, the method may include the step of monitoring, by a window position status monitoring device, a current position of the window and the step of sending window position status data from the window position status monitoring device to the controller.

The method may also include the step of configuring the controller to displace the dynamic surface into the deployed position in response to (a) the window being open and (b) sound pressure in a passenger compartment of the motor vehicle exceeding a predetermined threshold level.

The method may also include the steps of monitoring, by window position status monitoring device, a current position of the window and sending current window position status data from the window position status monitoring device to the controller. Further, the method may include the steps of monitoring, by sound pressure monitoring device, current sound pressure in a passenger compartment of the motor vehicle and sending current sound pressure data from the sound pressure monitoring device to the controller.

Still further, the method may include the step of configuring the controller to displace the dynamic surface into the deployed position in response to (a) the window being open and (b) speed of the motor vehicle exceeding a predetermined threshold level. Thus, the method may also include the steps of monitoring, by window position status monitoring device, a current position of the window and sending window position status data from the window position status monitoring device to the controller. Still further, the method may include the steps of monitoring, by motor vehicle speed monitoring device, current speed of the motor vehicle and sending current speed data from the motor vehicle speed monitoring device to the controller.

Still further, the method may include the step of configuring the controller to displace the dynamic surface into the home position in response to the window being closed. In addition, the method may include the step of configuring the controller to displace the dynamic surface into the home position in response to a transmission of the motor vehicle being placed into park. In addition, the method may include the step of configuring the controller to displace the dynamic surface into the home position in response to an ignition switch of the motor vehicle being turned off.

In the following description, there are shown and described several preferred embodiments of the mirror assembly and the related method of reducing wind noise throb associated with an open window of a motor vehicle. As it should be realized, the mirror assembly and method are capable of other, different embodiments and their several details are capable of modification in various, obvious aspects all without departing from the mirror assembly and method as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification, illustrate several aspects of the mirror assembly and related method and together with the description serve to explain certain principles thereof. In the drawing figures.

Reference will now be made in detail to the present preferred embodiments of the mirror assembly, an example which is illustrated in the accompanying drawing figures.

DETAILED DESCRIPTION

Figure 1A:
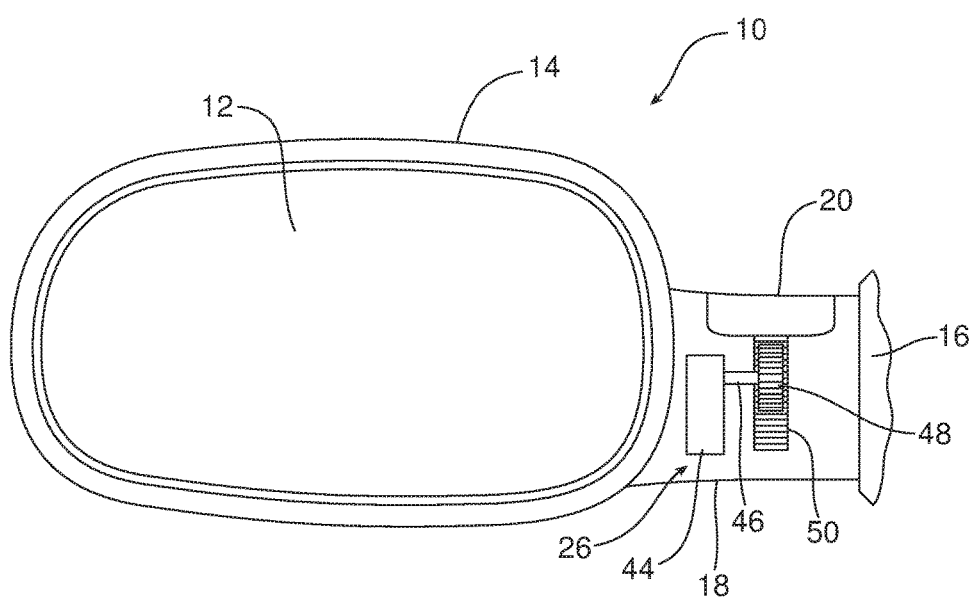
FIG. 1a is a schematic illustration of one possible operating embodiment of the mirror assembly wherein the dynamic surface on the support arm is shown in the home position.
Figure 1B:
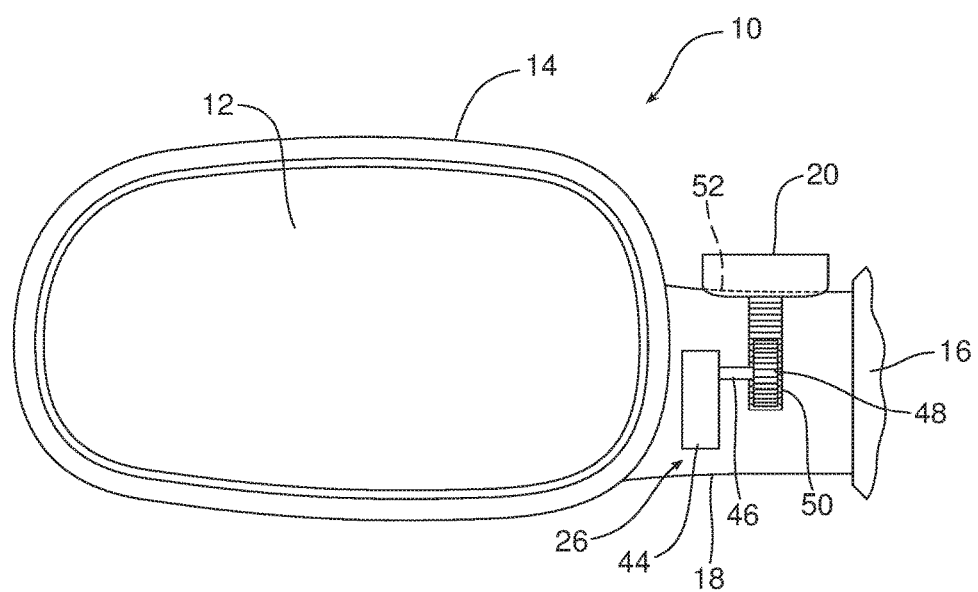
FIG. 1b is a view similar to FIG. 1a but illustrating the dynamic surface in the deployed position.

Reference is now made to FIGS. 1a and 1b illustrating the new and improved mirror assembly 10 which functions to reduce wind noise throb in an efficient and effective manner. The mirror assembly 10 includes a mirror body 12 held in a mirror housing 14 that is connected to the side 16 of a motor vehicle by a support arm 18.

A dynamic surface 20, in the form of a spoiler or sail surface is provided or carried on the support arm 18. In the illustrate embodiment, the dynamic surface 20 comprises a portion of the surface of the support arm 18 that is displaceable between a home position flush in the support arm (see FIG. 1a) and a raised or deployed position (See FIG. 1b) for deflecting air in a manner to reduce wind buffeting and wind noise throb.

Figure 2:
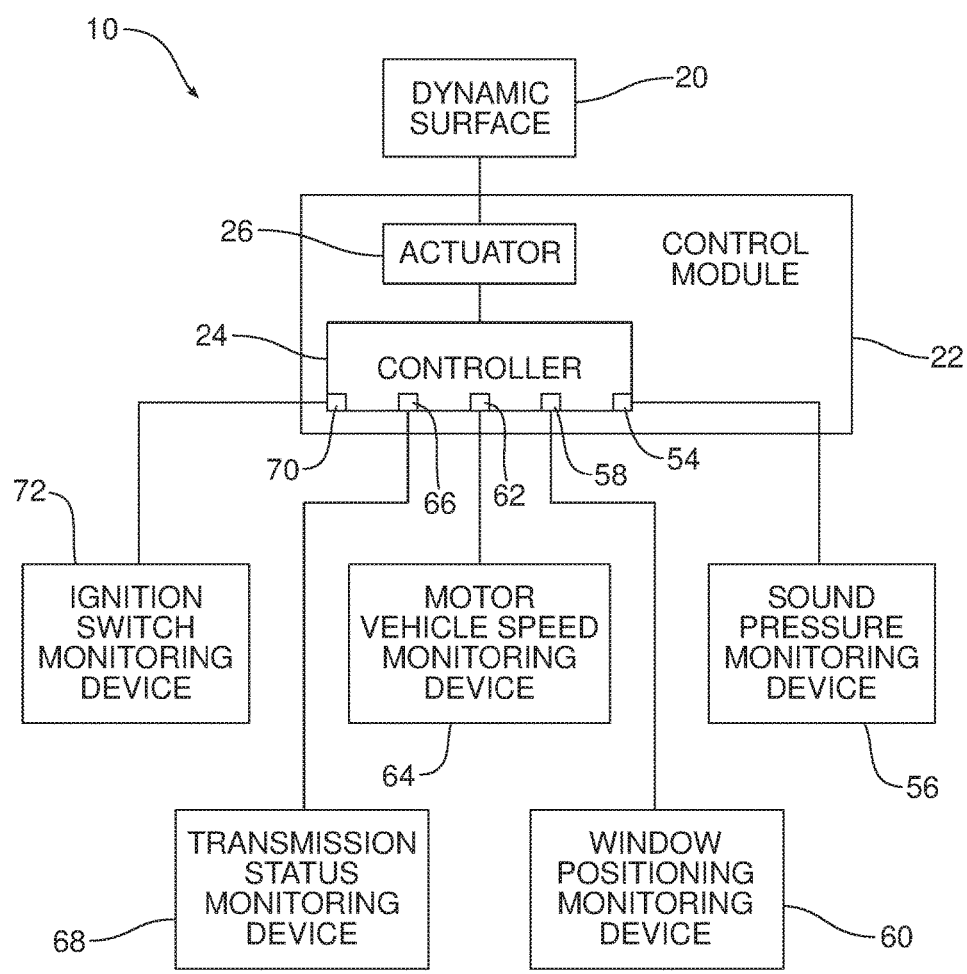
FIG. 2 is a schematic block diagram of one possible embodiment of a control system for the mirror assembly illustrated in FIGS. 1a and 1b.

As illustrated in FIG. 2, the mirror assembly 10 also includes a control module 22 that is configured to displace the dynamic surface 20 between the home position and the deployed position. The control module 22 includes a controller 24 and an actuator 26 controlled by that controller.

Figure 3:
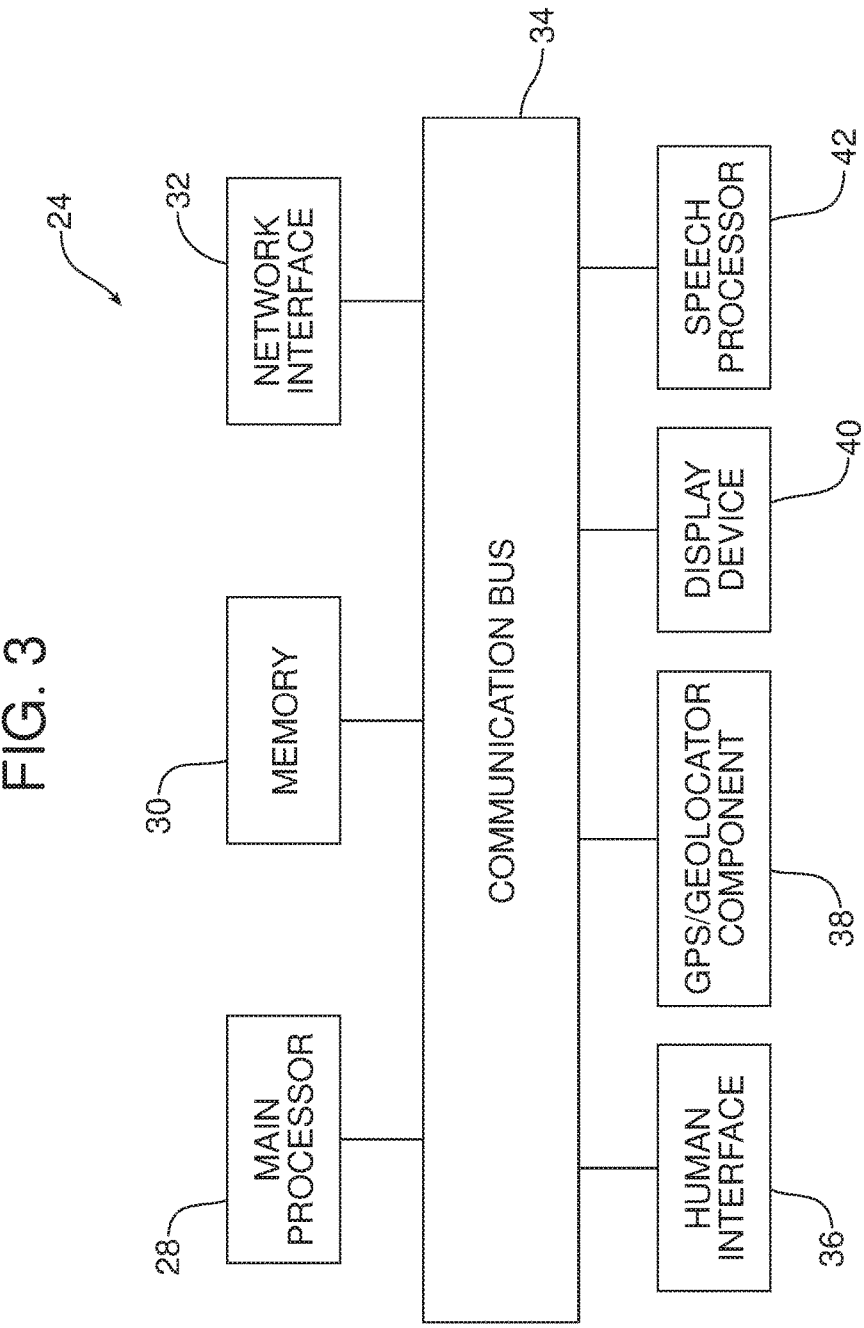
FIG. 3 is a schematic block diagram of the controller for the mirror assembly.

The controller 24 may be a computing device such as a dedicated microprocessor or electronic control unit (ECU) operating in accordance with instructions from appropriate control software. Thus, as illustrated in FIG. 3, the controller 24 may comprise one or more processors 28, one or more memories 30 and one or more network interfaces 32 which communicate with each other over a communication bus 34.

In some embodiments, the controller 24 may comprise a body control module or BCM and further include a human interface 36, a GPS/Geo Locator component 38, a display device such as a multi-function display with touchscreen capability 40 and a speech processor 42 that also communicate over the communication bus 34. The BCM may perform a number of interior body electrically based functions including, for example, interior locking, remote key entry, interior lighting, exterior lighting, windshield wiper control and the like. In some embodiments the BCM may also function to control entertainment functions (e.g. radio, CD player and communications such as telephone and internet communications over a wireless network). In some embodiments the BCM is connected by a communication bus (not shown) to other control modules that provide one or more of these additional functions.

The actuator 26 may take a number of different forms. In the illustrated embodiment, the actuator 26 comprises a drive motor 44 having a drive shaft 46 keyed to a pinion 48. The pinion 48 meshes with a gear rack 50 connected to and extending from the rear end of the dynamic surface 20. When the dynamic surface 20 is raised into the deployed position illustrated in FIG. 1b or lowered into the normal or home position illustrated in FIG. 1a, the front end thereof pivots about a hinge 52.

The controller 24 may be configured in a number of ways to control the displacement of the dynamic surface 20 between the home position and the deployed position and back again. As illustrated in FIG. 2, the controller includes a first data input 54 connected to a sound pressure monitoring device 56 of a type known in the art, a second data input 58 connected to a window position status monitoring device of a type known in the art, a third data input 62 connected to a motor vehicle speed monitoring device of a type known in the art, a fourth data input 66 connected to a transmission status monitoring device of a type known in the art and a fifth data input 70 connected to an ignition switch monitoring device of a type known in the art. The controller 24 may also include a data input (not shown) for position data respecting the dynamic surface 20.

As should be apparent from the above description, a method is provided of reducing wind noise throb associated with an open window of a motor vehicle. That method includes the step of displacing, by the actuator 26, the dynamic surface 20 on the support arm 18 from the home position illustrated in FIG. 1a to the deployed position illustrated in FIG. 1b whereby a wind stream flowing over the dynamic surface is redirected and wind noise throb is reduced.

The operation of the actuator 26 is controlled by means of the controller 24. More specifically, the method may include configuring the controller 24 to displace the dynamic surface 20 into the deployed position in response to a window of the motor vehicle being open. Thus, it should be appreciated that the method may include the steps of monitoring, by the window position status monitoring device 60, a current position of the window and sending window position status data from the window position status monitoring device to the controller 24 through the second data input 58.

The method may also include the step of configuring the controller 24 to displace the dynamic surface 20 into the deployed position in response to (a) the window being open and (b) sound pressure in a passenger compartment of the motor vehicle exceeding a predetermined threshold level wherein that threshold level is indicative of undesirable wind noise throb.

In such an embodiment, the method may include the step of monitoring, by the window position status monitoring device 60, a current position of the window and sending current window position status data from the window position status monitoring device to the controller 24 through the second data input 58. Further, the method may include monitoring, by the sound pressure monitoring device 56, current sound pressure in the passenger compartment of the motor vehicle and sending current sound pressure data from the sound pressure monitoring device to the controller 24 through the first data input 54.

In another possible embodiment, the method may include the step of configuring the controller 24 to displace the dynamic surface 20 into the deployed position in response to (a) the window being open and (b) speed of the motor vehicle exceeding a predetermined threshold level having a known potential wind noise throb for the particular make and model of motor vehicle to which the mirror assembly 10 is connected. In such an embodiment, the method may further include monitoring, by the window position status monitoring device 60, a current position of the window and sending window position status data from the window position status monitoring device to the controller 24 through the second data input 58. Further, in such an embodiment, the method may also include monitoring, by motor vehicle speed monitoring device 64, current speed of the motor vehicle and sending current speed data from the motor vehicle speed monitoring device to the controller 24 through the third data input 62.

The method may also include the step of configuring the controller 24 to displace the dynamic surface 20 into the home position in response to the window being closed as confirmed by data received at the data input 58 from the window position status monitoring device 60.

The method may also include the step of configuring the controller 24 to displace the dynamic surface 20 into the home position in response to a transmission of the motor vehicle being placed into park as confirmed by data received at the fourth data input 66 from the transmission status monitoring device 68.

In yet another possible embodiment, the method may include the step of configuring the controller 24 to displace the dynamic surface 20 into the home position in response to an ignition switch of the motor vehicle being turned off as indicated by ignition switch status data received at the fifth data input 70 from the ignition switch monitoring device 72.

Any of these last three method steps described above ensure that the dynamic surface 20 on the support arm 18 is displaced into the home position when the motor vehicle is parked.

The foregoing has been presented for purposes of illustration and description. It is not intended to be exhaustive or to limit the embodiments to the precise form disclosed. Obvious modifications and variations are possible in light of the above teachings. All such modifications and variations are within the scope of the appended claims when interpreted in accordance with the breadth to which they are fairly, legally and equitably entitled.

What is claimed:

1. A mirror assembly, comprising:
    a support arm;
    a mirror housing carried on said support arm;
    a mirror body held in said mirror housing;
    a dynamic surface on said support arm; and
    a control module configured to displace said dynamic surface vertically between a home position and a deployed position.

2. The mirror assembly of claim 1, wherein said control module includes a controller and an actuator controlled by said controller.

3. The mirror assembly of claim 2, wherein said actuator includes a drive motor, a pinion driven by said drive motor and a gear rack carried on said dynamic surface wherein said pinion engages said gear rack.

4. The mirror assembly of claim 3, wherein said controller is configured to displace said dynamic surface between said home position to said deployed position in response to data input respecting window position status.

5. The mirror assembly of claim 4, wherein said controller is configured to displace said dynamic surface between said home position and said deployed position in response to data input respecting sound pressure within a passenger compartment of a motor vehicle on which said mirror assembly is carried.

6. The mirror assembly of claim 3, wherein said controller is configured to displace said dynamic surface between said home position and said deployed position in response to data input respecting sound pressure within a passenger compartment of a motor vehicle on which said mirror assembly is carried.

7. A method of reducing wind noise throb associated with a window of a motor vehicle, comprising:
    displacing, by actuator, a dynamic surface on a support arm of a mirror assembly from a home position to a deployed position whereby a wind stream flowing over said dynamic surface is redirected and wind noise throb is reduced;
    controlling operation of said actuator with a controller; and
    configuring said controller to displace said dynamic surface into said deployed position in response to said window being open.

8. The method of claim 7, including monitoring, by a window position status monitoring device, a current position of said window; and
    sending window position status data from said window position status monitoring device to said controller.

9. The method of claim 7, including configuring said controller to displace said dynamic surface into said deployed position in response to (a) said window being open and (b) sound pressure in a passenger compartment of said motor vehicle exceeding a predetermined threshold level.

10. The method of claim 9, including monitoring, by window position status monitoring device, a current position of said window; and
    sending current window position status data from said window position status monitoring device to said controller.

11. The method of claim 10, including monitoring, by sound pressure monitoring device, current sound pressure in the passenger compartment of said motor vehicle; and
    sending current sound pressure data from said sound pressure monitoring device to said controller.

12. The method of claim 7, including configuring said controller to displace said dynamic surface into said deployed position in response to (a) said window being open and (b) speed of said motor vehicle exceeding a predetermined threshold level.

13. The method of claim 12, including monitoring, by window position status monitoring device, a current position of said window; and
    sending window position status data from said window position status monitoring device to said controller.

14. The method of claim 13, including monitoring, by motor vehicle speed monitoring device, current speed of said motor vehicle; and
    sending current speed data from said motor vehicle speed monitoring device to said controller.

15. The method of claim 7, including configuring said controller to displace said dynamic surface into said home position in response to said window being closed.

16. The method of claim 7, including configuring said controller to displace said dynamic surface into said home position in response to a transmission of said motor vehicle being placed into park.

17. The method of claim 7, including configuring said controller to displace said dynamic surface into said home position in response to an ignition of said motor vehicle being turned off.

* * * * *